(12) United States Patent  (10) Patent No.: US 8,707,619 B2
Edwards et al.  (45) Date of Patent: Apr. 29, 2014

(54) BIOLOGICAL AIR FILTER

(75) Inventors: David A. Edwards, Boston, MA (US); Mathieu Lehanneur, Paris (FR)

(73) Assignee: Labstore, S.A.S., Paris (FR)

(*) Notice: Subject to any disclaimer, the term of this patent is extended or adjusted under 35 U.S.C. 154(b) by 422 days.

(21) Appl. No.: 12/682,353

(22) PCT Filed: Oct. 8, 2008

(86) PCT No.: PCT/US2008/079163
§ 371 (c)(1),
(2), (4) Date: Dec. 14, 2010

(87) PCT Pub. No.: WO2009/048925
PCT Pub. Date: Apr. 16, 2009

(65) Prior Publication Data
US 2011/0094156 A1  Apr. 28, 2011

Related U.S. Application Data

(60) Provisional application No. 60/978,959, filed on Oct. 10, 2007.

(51) Int. Cl.
*A01G 9/02* (2006.01)
(52) U.S. Cl.
USPC ............... 47/66.7; 422/124; 96/135
(58) Field of Classification Search
USPC ............ 47/66.7, 66.5, 69, 62; 96/108, 135; 422/122–124, 4
See application file for complete search history.

(56) References Cited

U.S. PATENT DOCUMENTS

| | | | | |
|---|---|---|---|---|
| 4,884,366 A | * | 12/1989 | Morton | 47/62 C |
| 4,961,763 A | | 10/1990 | Thompson et al. | |
| 4,975,251 A | * | 12/1990 | Saceman | 422/124 |
| 5,078,972 A | * | 1/1992 | Saceman | 422/124 |
| 5,277,877 A | * | 1/1994 | Jeffrey et al. | 47/66.6 |
| 5,315,834 A | * | 5/1994 | Garunts et al. | 62/78 |

(Continued)

FOREIGN PATENT DOCUMENTS

| | | |
|---|---|---|
| FR | 2 837723 | 10/2003 |
| FR | 2837723 | 10/2003 |
| JP | 3041734 | 10/1997 |
| JP | 2002-000709 | 1/2002 |
| JP | 2002 000709 | 1/2002 |
| WO | 02/053977 | 7/2002 |
| WO | WO 02/053977 | 7/2002 |
| WO | 2007/052323 | 5/2007 |
| WO | WO 2007/052323 | 5/2007 |

OTHER PUBLICATIONS

Maki, Toshiaki, "Translation of the Notification of Reasons for Rejection", Japanese Application No. 2010-528991, issued on Apr. 3, 2012 (2 pages).
International Search Report; PCT/US2008/079163; M Maremonti, May 2009.
Maremonti, Michele, European Patent Office "Communication pursuant to Article 94(3) EPC", EP Application No. 08 837 567.0, issued Nov. 15, 2011 (5 pages).

*Primary Examiner* — Kristen C Hayes
(74) *Attorney, Agent, or Firm* — Fish & Richardson P.C.

(57) ABSTRACT

A novel apparatus for the treatment, e.g., cleaning, humidifying, filtration and/or detoxifying, of ambient air incorporates a plant, soil, roots and a water reservoir to allow for effective filtration of air over an extended period of time. In particular, the device is designed with an air impeller system such that external "dirty" air is circulated within the device in the proximity of the plant, soil, roots and/or water reservoir, thereby removing impurities, toxins and other undesirable chemicals from the air. The apparatus and methods of the present invention are readily applicable to a number of applications where air treatment is desired, e.g., household use. Moreover, by incorporating a plant system, the apparatus serves not only a functional but an aesthetic purpose as well.

5 Claims, 16 Drawing Sheets

(56) References Cited

U.S. PATENT DOCUMENTS

| | | | |
|---|---|---|---|
| 5,397,382 A * | 3/1995 | Anderson | 96/135 |
| 5,407,470 A * | 4/1995 | Jutzi | 96/121 |
| 5,433,923 A | 7/1995 | Wolverton et al. | |
| 5,853,460 A | 12/1998 | Alcordo | |
| 6,006,471 A | 12/1999 | Sun | |
| 6,230,437 B1 | 5/2001 | Wolverton et al. | |
| 6,727,091 B2 * | 4/2004 | Darlington | 435/299.1 |
| 6,766,817 B2 | 7/2004 | Da Silva | |
| 2003/0224507 A1 * | 12/2003 | Darlington | 435/300.1 |
| 2005/0097871 A1 | 5/2005 | Glassman | |

* cited by examiner

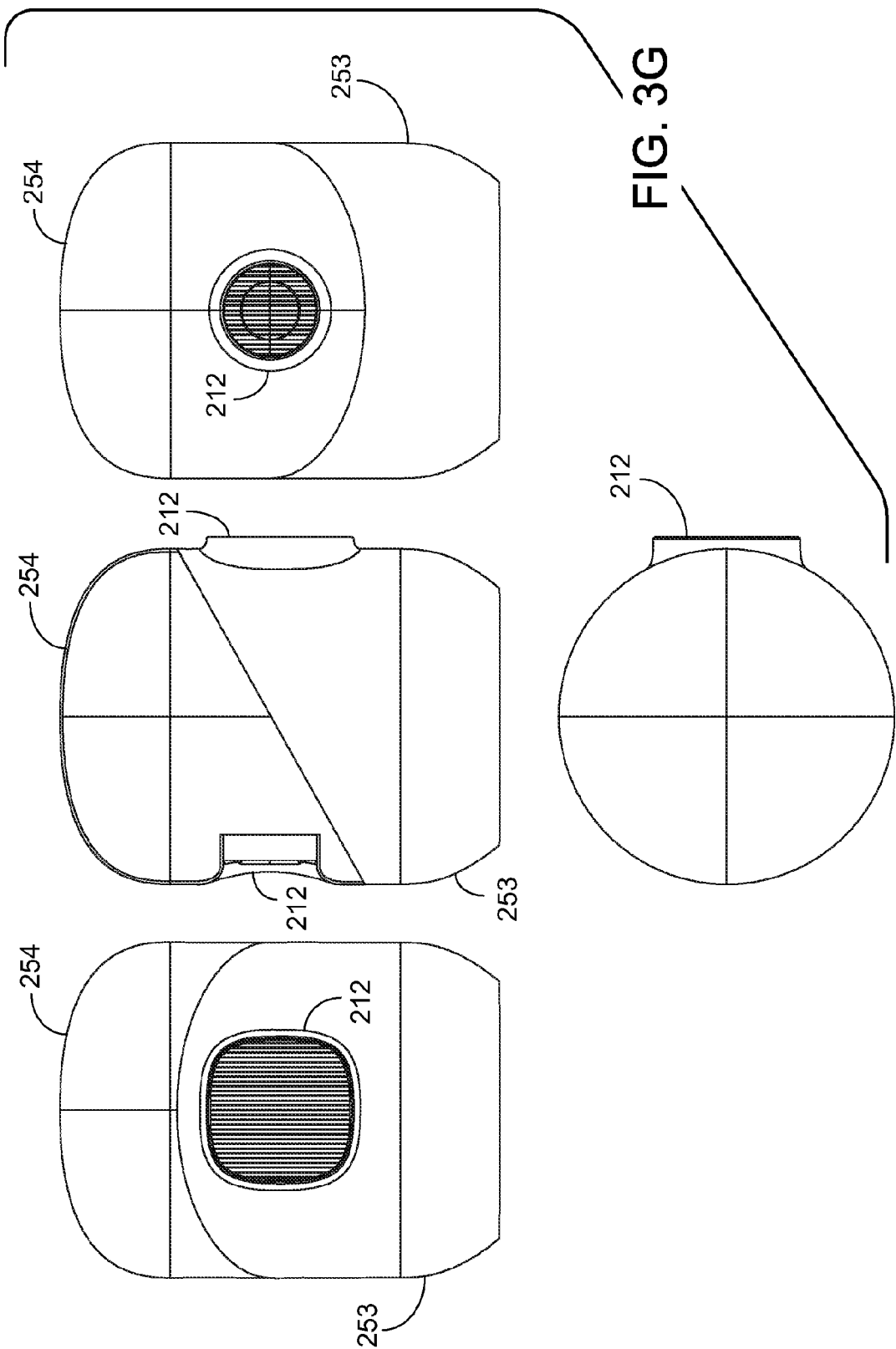

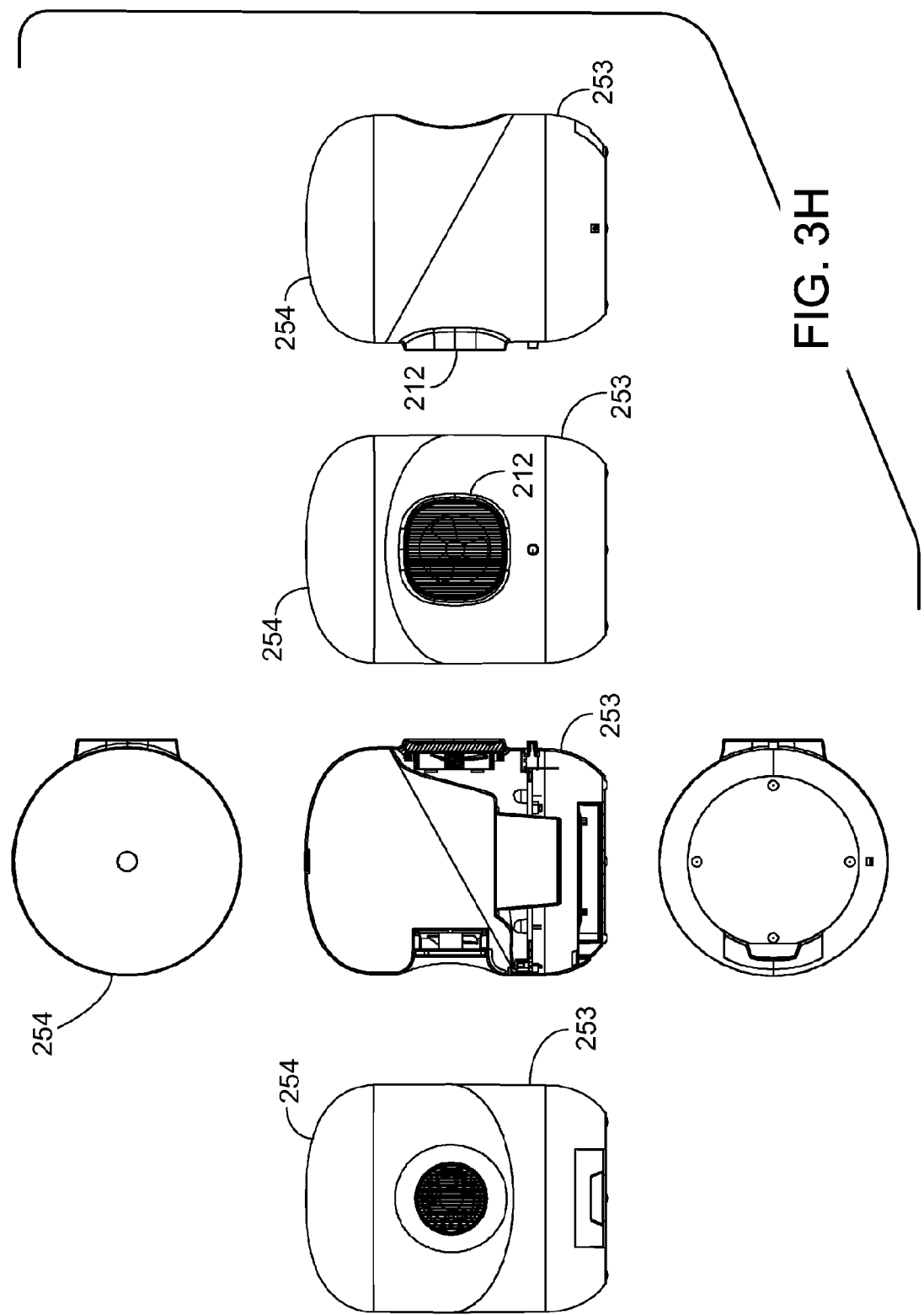

Biological Air Filter - Summary of Test Conditions: Component Testing

| Test | Inlet Fan | Cover | Plant | Leaves | Soil | Water | Outlet Fan | Key Variable(s) | Relative Filtration Efficacy |
|---|---|---|---|---|---|---|---|---|---|
| 1 | On | Present | Spathiphyllum | Present | Present | Present | On | Overall Filtration (Spath.) | High |
| 2 | On | Present | Spathiphyllum | Present | Present | NONE | On | Lack of Water (Spath.) | High |
| 3 | On | Present | NONE | n/a | Present (new) | Present | On | Soil+Water w/o Plant | High |
| 4 | On | Present | NONE | n/a | Present (new) | Present | On | Soil+Water w/o Plant | High |
| 5 | OFF | Present | Spathiphyllum | Present | Present | Present | On | No Inlet Fan (Spath.) | High |
| 6 | On | Present | Orchidea | Present | Present | Present | On | Overall Filtration (Orchid.) | High |
| 7 | On | Present | Orchidea | Present | NONE | Present | On | Lack of Soil (Orchid.) | High |
| 8 | On | Present | Spathiphyllum | Present | NONE | Present | On | Lack of Soil (Spath.) | High |
| 9 | On | Present | Spathiphyllum | REMOVED | Present | Present | On | Lack of Leaves (Spath.) | High |
| 10 | OFF | REMOVED | Spathiphyllum | Present | Present | Present | OFF | Fans Off (Spath.) | Intermediate |
| 11 | OFF | REMOVED | Spathiphyllum | Present | Present (new) | Present (new) | OFF | Fans Off (Spath.) | Intermediate |
| 12 | OFF | REMOVED | Orchidea | Present | Present | Present | OFF | Fans Off (Orchid.) | Intermediate |
| 13 | On | Present | NONE | n/a | NONE | NONE | On | Housing Alone | None/Nearly None |

FIG. 5B

BIOLOGICAL AIR FILTER

This application is the National Stage International Application No. PCT/US2008/079163, filed on Oct. 8, 2008, which claims priority to U.S. Provisional Application Ser. No. 60/978,959, filed on Oct. 10, 2007. The contents of the above-referenced applications are hereby incorporated by reference in their entireties.

FIELD OF THE INVENTION

The invention relates generally to biological air filters and methods for using the same.

BACKGROUND OF THE INVENTION

Previous researchers have demonstrated that plants can be utilized to extract undesirable substances from the air including by absorption of such substances. Certain designs have been proposed for utilizing the power of plants to absorb and remove such undesirable impurities so as to render the environment healthier.

SUMMARY OF THE INVENTION

A novel apparatus for the treatment, e.g., cleaning, humidifying, filtration and/or detoxifying, of ambient air has now been discovered. The device incorporates a plant, soil, roots, and a water reservoir to allow for effective filtration of air over an extended period of time. In particular, the device is designed with an air impeller system such that external "dirty" air is circulated within the device in the proximity of the plant, soil, roots and/or water reservoir, thereby removing impurities, toxins and other undesirable chemicals from the air. The series of components, creating a top down filtration system, heightens the absorptive properties of each of the individual components. More generally, the combination of filtering components is believed to heighten the overall filtration capacity. The apparatus and methods described are readily applicable to a number of applications where air treatment is desired, e.g., household or office use. Moreover, by incorporating a plant system, the apparatus serves not only a functional but an aesthetic purpose as well.

In one aspect, an apparatus for use in treating (e.g., cleaning, filtering, humidifying and/or detoxifying) air includes a plant with leaves and roots; a soil substrate; a water reservoir; and an air impeller system for receiving air external to the apparatus, for circulating air in the proximity of the leaves of the plant, in the proximity of the roots of the plant, and through the soil substrate, and for emitting air from the apparatus. Each of the leaves, roots, soil substrate, and water reservoir may be contained within the internal volume of a housing. As used herein, the term "leaves" is used to indicate an above-ground plant organ specialized for photosynthesis. Thus, "leaves" include, for example, leaves of flowers, needles of conifers, and fronds of ferns.

The air impeller system can include one or a series of fans including, but not limited to, an input fan for receiving air external to the apparatus and/or for directing the flow of air within the internal volume of the housing; an output fan for emitting air from the apparatus and/or for directing the flow of air within the internal volume of the housing; and/or an internal fan for directing the flow of air within the internal volume of the housing. In yet another embodiment, the apparatus includes a controller to control the speed and/or direction of the air impeller system. In various embodiments, the inlet and outlet fan speeds can be approximately 100, 125, 150, 175, 200, 225, 250, 275, 300, 325, 350, 375, or 400 cubic meters per hour. The ratio of the speeds of the inlet and outlet fans can vary.

Having a sufficient fan speed, and/or sufficient effective throughput of air through the apparatus (as modulated by the resistance of various components (e.g., the soil)), is important in enabling effective cleaning of the air in a room in a reasonable amount of time or potentially at all. Given air turnover and/or the continued production or emission of undesirable substances into the air, low-fan-speed or low-throughput apparatuses may be relatively less effective in providing a net reduction in undesirable substances, or may only be capable of doing so if run for an extended time.

In particular, for a room of a certain volume (V) with a circulation time Tcirculation of air by convection (including e.g., turnover through windows, under doors etc.), the net flow rate of dirty air through the filter (Q) is selected to be large enough so that $$V/Q << T\text{circulation}.$$

where V (m$^3$)=volume of space
Q (m$^3$/h)=airflow i.e. filtration rate

Tfiltration~V/Q(h)

For situations in which pollutants are being added to a room (e.g., being produced by smoking or the use of household cleaners), systems can be configured such that $$T\text{filtration} < T\text{production} << T\text{circulation}$$

where Tproduction=characteristic time of production of pollutants
Tcirculation=characteristic time of all air circulating out of room to provide a desired level of filtration.

In some embodiments, the air impeller system directs the center of mass of the air received into the apparatus to the leaves of the plant prior to the roots or the soil substrate. In some embodiments, the air impeller system circulates the center of mass of the air within about 10 cm, 8 cm, 6 cm, 4 cm, 2 cm or 1 cm of a plant leaf. In some cases, the air impeller system circulates air in the proximity of or through the leaves of the plant, the roots of the plant and/or the soil substrate at least twice. In some cases, the air impeller system circulates air in the proximity of or through the water reservoir.

In some embodiments, the housing comprises at least two compartments, wherein the water reservoir is contained in a compartment separate from the plant and soil substrate. In some cases, the water reservoir is replaceable. The apparatus may further include a wick extending from the water reservoir to the soil substrate. In some cases, the apparatus includes a second water reservoir, wherein the first water reservoir provides hydration to the soil and roots and wherein the second water reservoir provides hydration to the leaves.

In some embodiments, the apparatus includes a separate compartment including humid air, for example, having at least 50%, 60%, 70%, 80% or 90% humidity. The compartment may be adjacent to the water reservoir, for example, the compartment containing the water reservoir. The apparatus may be designed such that the air impeller system circulates air through the compartment comprising humid air.

In some embodiments, the housing is formed at least in part of a transparent material. The apparatus may further include a mirror.

In some embodiments, the soil includes activated carbon.

In another aspect, methods for treating (e.g., cleaning, filtering, humidifying and/or detoxifying) air include: directing air being treated past leaves of a plant prior to the air passing through a soil substrate supporting roots of the plant; substantially removing impurities from the air. Removing impurities from the air includes: using the leaves of the plant to remove a first portion of the impurities; and using passage through the soil substrate to remove a second portion of the impurities.

In some embodiments, the impurities are selected from the group consisting of toxins, chemicals, contaminants and a combination thereof. In some embodiments, the impurities are selected from the group consisting of formaldehyde, carbon monoxide, benzene and trichloroethylene. In some cases, methods also include contacting the air being treated with water in a water reservoir. In some cases, directing air being treated past leaves of a plant prior to the air passing through a soil substrate supporting roots of the plant includes: operating a first fan to cause ambient air to enter an internal volume defined by a housing wherein the plant is substantially disposed in the internal volume of the housing; and operating a second fan to cause air in the internal volume of the housing to be discharged out of the housing. In some cases, methods also include varying a ratio of a speed of the first fan to a speed of the second fan.

The impurities may be selected from the group consisting of toxins, chemicals, contaminants and a combination thereof. In particular embodiments, the impurities are selected from the group consisting of formaldehyde, carbon monoxide, benzene and trichloroethylene.

Apparatuses and methods as described herein can provide a filtration rate sufficient to practically lower airborne impurities. Moreover, many of these devices can have an increased operational life relative to prior art devices with comparable filtration rates and efficiencies. The details of one or more embodiments are set forth in the accompanying drawings and the description below. Other features and advantages will be apparent from the description and drawings, and from the claims.

DESCRIPTION OF THE DRAWINGS

FIG. 3G shows front, side, back and top views of the exemplary biological air filter shown in FIGS. 3A and 3B.

FIG. 3H shows various cross sectional views of the exemplary biological air filter shown in FIGS. 3A and 3B.

FIG. 5B presents a table with details of the trials whose results are presented in FIG. 5A.

DETAILED DESCRIPTION OF THE INVENTION

The apparatuses and methods described are based, at least in part, on the discovery that the effectiveness and lifespan of plant-based air filtration systems can be enhanced by directing dirty air received externally from the apparatus to the leaves of the plant so as to maximize the absorptive capacity of the plant and to further extend the lifetime of the air filtration apparatus. Moreover, apparatuses and methods described are further based, in part, on the appreciation that passage of air through or in proximity of a water reservoir, or alternatively, humid air, further serves to enhance the absorptive capacity and extend the lifetime of the plant based air filtration systems. Accordingly, the apparatus includes an air impeller system that directs air, for example, the center mass of air received into the apparatus, proximally to the leaves of the plant and/or subsequently, proximally or through a water reservoir or humid air.

Figure 1:
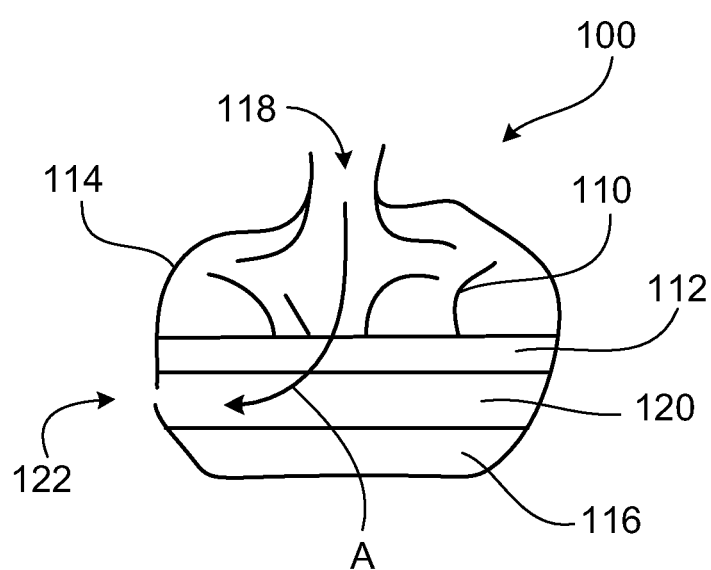
FIG. 1 is a schematic of an exemplary biological air filter.

Referring to FIG. 1, a top down filtration system 100 includes a plant or plants 110 growing out of soil 112 within a housing 114. The housing 114 also contains a water reservoir 116. Air enters the housing 114 through inlet 118 and passes past the plant(s) 110 and through soil 112 into a space 120 between the soil 112 and water reservoir 116. Due to the proximity of water reservoir 116, air in space 120 can have a higher water content/humidity than air in other portions of the system, and/or than in the external environment. Treated air exits the housing 114 through outlet 122. The general flow of air through the system 100 is indicated by arrow A.

The system 100 also includes an impeller system (not shown in FIG. 1). The air impeller system is configured: (1) to receive air from external to the apparatus, (2) to direct the air onto surfaces of the leaves of the plant, through the leaves into proximity of the roots of the plant, and onto and through the soil substrate, and (3) to exhaust treated air from the apparatus. In particular, the air impeller system can direct a center of mass of the air received into the system 100 near to surfaces of the leaves of the plant 110 before passing through the soil substrate (e.g., near the roots of the plant). The air impeller system can include, for example, an inlet fan disposed in inlet 118 and/or an outlet fan disposed in outlet 122.

The specific series of components, in this embodiment, creates a top down filtration system, heightening the absorptive properties of each of the individual components. More generally, the combination of multiple filtering components is believed to heighten the overall filtration capacity. While the plant itself may have the ability to absorb some chemicals, it is limited to that volume of air that comes directly into contact with the leaves, stems, and roots. Air convection into the enclosed space increases the volume of air that comes into contact with the plant (over some period of time), increasing the level of contact with the plant. Air convection out of the space serves to draw air through the soil layer and over the water layer, creating an additional filtration step. If only a single component were used, such as the plant alone, the plant's natural ability to absorb chemicals would eventually become overwhelmed, and the system would be unable to effectively filter the air over time. However, the combined abilities of the apparatus allows each component to contribute to the overall filtration efficacy and capacity without leading to an overwhelmed and ineffective system. Some of these components include the soil, stem, roots, leaves, water, etc.

One advantage of the present biological air filtration apparatus is that it allows for improved cleaning, filtration, humidifying and detoxifying of air. In addition, the biological air filtration apparatuses described can exhibit longer operational lifetimes. Without wishing to be bound to any particular theory, it is believed that, by directing air toward the leaves prior to directing air through the soil and roots of a plant system, the apparatus better harnesses the filtration, cleaning and detoxifying capacity of the leaves. In contrast, devices that direct air through the roots or the soil prior to directing air to the vicinity of the leaves make less effective use of the filtration, cleaning and detoxifying ability of the leaves. Indeed, the filtration, cleaning and detoxifying processes of such prior art devices may be performed predominantly or even exclusively by the roots and soil and, accordingly, over time, the roots and soil become more quickly contaminated with impurities extracted from the air. Over time, such devices ultimately may re-emit such impurities and serve to pollute the very air the devices are designed to clean. However, by directing air proximally to the leaves of the plant prior to contact with the roots and soil, each part of the plant system, including, but not limited to, the leaves, roots and soil, contribute to the filtration, cleaning and detoxifying of the air, thereby enhancing the effectiveness and extending the lifetime of the apparatus.

Moreover, without wishing to be bound to any particular theory, it is believed that by directing the air through or proximally of a water reservoir and/or humid air, the air is not only humidified, but further filtered, cleaned and detoxified. Such design further serves to extend the life of the apparatus in that the water reservoir contaminated with impurities extracted from the air can be replaced with clean water. Similarly, the humid air ultimately condenses and may be replaced.

In one aspect, an apparatus for use in cleaning, filtering, humidifying and/or detoxifying air includes a plant formed of leaves and roots; a soil substrate; a water reservoir; and an air impeller system for receiving air external to the apparatus, for circulating air in proximity of the leaves of the plant, the roots of the plant, and the soil substrate, and for emitting air from the apparatus; each contained within a housing.

The plant may be any plant capable of absorbing impurities from the air. Generally, plants exhibit an ability to absorb and metabolize impurities, including various forms of harmful airborne substances. Conventional household plants, as well as plants particularly suited for absorption of impurities, can be used in the filter. In some embodiments, the plant is a chlorophytum plant. Further exemplary plants include, but are not limited to, *Gerbera jamesonii*, *Hedera helix* (English ivy), *Chlorophytum comosum* (spider plant), *Epipiremnum aureum* (golden pothos), *Spathiphyllum* 'Mauna Loa' (peace lily), *Aglaonema modestum* (Chinese evergreen), *Chamaedorea sefritzii* (bamboo or reed palm), *Sansevieria trifasciata* (snake plant), *Philodendron scandens* 'oxycardium' (heartleaf philodendron), *Philodendron selloum* (selloum philodendron), *Philodendron domesticum* (elephant ear philodendron), *Dracaena marginata* (red-edged dracaena), *Dracaena fragrans* 'Massangeana' (cornstalk dracaena), *Dracaena deremensis* 'Janet Craig' (Janet Craig dracaena), *Dracaena deremensis* 'Warneckii' (Warneck dracaena), *Phalaenopsis* (orchid), and *Ficus benjamina* (weeping fig).

The apparatus further includes the roots of the plant and soil substrate which are also capable of absorbing impurities from the air. Moreover, the roots are also capable of regenerating air containing harmful substances using a bioregenerative process. In some embodiments, the soil includes activated carbon and/or pea gravel. Optionally, the soil may also contain various other additives including, but not limited to, peat moss, coir, ground pine bark and inorganic materials such as washed sand, perlite or vermiculite. In some embodiments, the soil may additionally, or alternatively, contain or be infused with soil bacteria, which serve to enhance the regeneration of air from which harmful substances have been removed and, further, to destroy pathogenic germs.

As used herein, the term "impurity" refers to any contaminant, toxin, chemical or harmful substance contained within the air including, but not limited to, formaldehyde, carbon monoxide, benzene and trichloroethylene. In various embodiments, the apparatus of the present invention may remove at least about 20, 25, 30, 35, 40, 45, 50, 55, 60, 65, 70, 75, 80, 85, 90 or 95% of the impurities in the air. In various embodiments, the apparatus of the present invention may remove a certain percentage of the impurities in less than about 48, 24, 12, 8, 6, 5, 4, 3, 2, 1.5, 1, or 0.5 hours.

The apparatus further includes an air impeller system. The term "air impeller system" as used herein refers to a system configured to receive air into, direct air within, and emit air from the apparatus. The air impeller system may be any art known device for controlling the flow of air into, within, and from the apparatus. In some embodiments, the air impeller system includes at least one fan. In some embodiments, the air impeller system includes a series of fans, for example, which work in a coordinated fashion to control the flow of air into, through and out of the apparatus. In some embodiments, the apparatus includes an "input fan" controlling the ingress of air into the internal volume of the apparatus and, optionally, the direction of air within the apparatus. In some embodiments, the apparatus includes an "internal fan" controlling the direction of air within the apparatus. In some embodiments, the apparatus includes an "output fan" directing the egress of air from the apparatus and, optionally, the direction of air within the apparatus.

The air impeller system is designed and configured so as to increase the cleaning, detoxifying and/or filtering capabilities of the apparatus. Accordingly, the air impeller system is designed so as to direct the air, for example, the center of mass of the air, in proximity of the leaves of the plant, through the soil and in proximity of the roots of the plant at least once. In some embodiments, the air impeller system directs air by or through the leaves, roots or soil or the plant system at least 2, 3, 4, 5, 6, 7, 8, 9, 10, 15 or 20 times. As used herein, the term "in proximity of" or "proximally of" refers to either the passage of the center of mass of air along the surface or within less than about 1, 2, 3, 4, 5, 6, 7, 8, 9, 10, 15 or 20 cm.

In some embodiments, the air impeller system is designed and configured so as to direct the air in proximity of the leaves of the plant prior to passage through or by the soil and roots of the plant system. In other embodiments, the air impeller system directs air proximally of the stem of the plant.

In another embodiment, the apparatus comprises a controller for controlling the speed and/or direction of the air convention means. In some embodiments, the controller coordinates the fan(s) to operate, for example, in a predetermined manner or alternatively, as desired by the user, so as to control the flow and direction of air into, through and from the device. The controller may be any controlling system including, for example, a simple on/off switch, a dial with predetermined settings (off, low, high, etc), or a dial with user-adjusted settings. Accordingly, the speed of the air impeller system may be adjusted as desired so as to adjust the flow of air into, through, or out of the apparatus. In some embodiments, the apparatus contains both an inlet fan, directing air into the enclosed plant space, and an outlet fan, which draws the air through the system. In various embodiments, the inlet and outlet fans speeds can approximately be 100, 125, 150, 175, 200, 225, 250, 275, 300, 325, 350, 375, or 400 cubic meters per hour. The ratio of the speeds of inlet and outlet fans can vary and may be controlled by the controller.

In conjunction with the speeds of the inlet and outlet fans, the resistance provided by the plant and the soil substrate are critical factors which impact throughput. If the plant/soil resistance is high, the inlet and outlet fans may not be able to provide sufficient air flow through the system. If the plant/soil resistance is too low, air circulating in the system will not be in contact with the system long enough, and/or may not be in close enough contact with the system, to effectively filter the air.

Previous inventions in this space may not have recognized the importance of fan speed, or of the actual throughput of air through the apparatus. In order to be able to effectively clean the air in a room, it should be done in a reasonable time frame so that ineffective air turnover combined with source chemical production do not lead to a buildup of chemicals in the air. By increasing the fan speed, both inlet and outlet, a relatively large volume of air can be caused to flow through the system, allowing a larger volume of air to be filtered by the combination of components. The resistance to airflow of various components within the apparatus, such as the soil, may be important factors impacting the overall rate of air passage through the apparatus. Separately from the fan speeds, it may be possible to optimize the throughput of air by modifying the resistance to airflow of such components, for example by decreasing the thickness or compaction of the soil in the general direction of the airflow to reduce overall resistance and increase throughput.

As used herein, the term "water reservoir" refers to a collection of water contained within the apparatus, or to any quantity of water that is associated with or part of such a collection of water. The water reservoir serves, at least in part, to hydrate the soil, hydrate the roots of the plant, and hydrate the leaves of the plant. In some embodiments, the water reservoir is contained within a compartment of the apparatus. In other embodiments, the water reservoir is contained in at least two compartments, for example, one compartment designed to hydrate the soil and the roots and another compartment designed to hydrate the leaves of the plant. In some embodiments, the water reservoir is hydraulically connected with the soil and/or roots of the plant via a wick.

In addition, the water reservoir may serve as a source of humidity within the apparatus. For example, in some embodiments, the apparatus may include a separate compartment containing humid air. Alternatively or in addition, the apparatus may include humid air surrounding the leaves of the plant.

The apparatus can be configured such that the rate of circulation of water droplets between the air and the source of humidity is faster than the rate of movement of air through the humid chamber. Pollutants can be absorbed by water droplets in the air, which circulate back to the water, and new water droplets circulate back into the air. Thus the humidity source, in addition to providing moisture to the system, has a cleansing function as well and helps dilute the impurities in the air being filtered.

In certain embodiments, the air impeller system directs air through or in proximity of the water reservoir and/or through humid air, for example, humid air surrounding the leaves of the plant and/or humid air contained within a separate compartment. In various embodiments, the humid air has a relative humidity of at least 50, 55, 60, 65, 70, 75, 80, 85, 90 or 95%. In certain embodiments, the apparatus further includes a humidity controller so as to produce the desired humidity in the desired region of the apparatus.

Such design serves to further enhance the effective filtering, cleaning or detoxifying of air by removing impurities from the air. Moreover, because the water reservoir may be replaceable, the extracted impurities (e.g., those absorbed from the dirty air and, therefore, contained within the water reservoir) can be removed from the system altogether, thereby preventing or reducing the re-entrainment of air with impurities. Similarly, humid air containing impurities can condense and thereby be replaced with new water so as to further remove the impurities from the system. In particular embodiments, the air impeller system directs air through or proximally of the water reservoir and/or humid air after the air has passed proximally of the leaves or, alternatively, the entire plant system. Accordingly, the water reservoir and/or humid air can serve a supplementary role in removing certain remaining impurities contained within the air.

In some embodiments, each of the plant, roots, soil substrate and water reservoir are contained within a housing. Alternatively, only certain components of the apparatus are contained within the housing. For example, the plant system (e.g., leaves, roots and soil) may be contained within the housing but have access to a water reservoir external to the housing. The housing may be a closed environment, excepting the air impeller system which serves to control the input and output of air from the housing.

In some embodiments, the soil layer may contain pea gravel, potting soil, bark, activated carbon, etc., or any combination thereof. Each material will be selected to have some level of ability to filter out different chemicals, and a combination of different types can be developed to achieve maximum efficacy against differing chemicals. For example, activated carbon can adsorb oil vapors, odors, and other hydrocarbons from the air, however its use must be balanced with the soil composition needed for the plant to survive.

The housing may be formed of any material that is sturdy and prevents the undesirable leakage of air from the internal volume of the housing. In some embodiments, the housing is formed, at least in part, of a transparent piece of plastic, for example, PLEXIGLAS®, so as to allow the plant to receive natural and/or artificial light as necessary for survival. In some embodiments, the housing further contains a mirror positioned so as to reflect natural and/or artificial light toward the plant, thereby further providing necessary light for plant survival. Indeed, in certain embodiments, the mirror may be positioned so as to provide light to areas of the plant that are otherwise inaccessible to light or that receive insufficient light. In some embodiments, an artificial light source may be placed in proximity to the plant, for example within the housing, and may be physically associated to the apparatus.

Though the plant is largely contained within the walls of the housing, there exist openings to the outside environment for the passage of air from the external environment to the filter, and then out of the filter. These openings may represent different percentages of the surface of the housing. In some embodiments, the opening(s) represent(s) access to a fan ventilation system. In some embodiments, the opening(s) may have the form of a vase opening. In some embodiments in which only an outlet fan may exist, the opening(s) may have the form of a vase opening.

The biological air filter is especially suited for use in the office and the home. Indeed, by incorporating a plant as a prominent and visible feature in the apparatus, the apparatus further serves an aesthetic purpose. In addition, the device of the invention may also be used in work places where solvent vapors are released in small amounts, for example labs, doctor offices, graphic arts businesses, and the like.

The following examples are expected to be illustrative and in no way limit the scope of the invention.

Example 1

Figure 2:
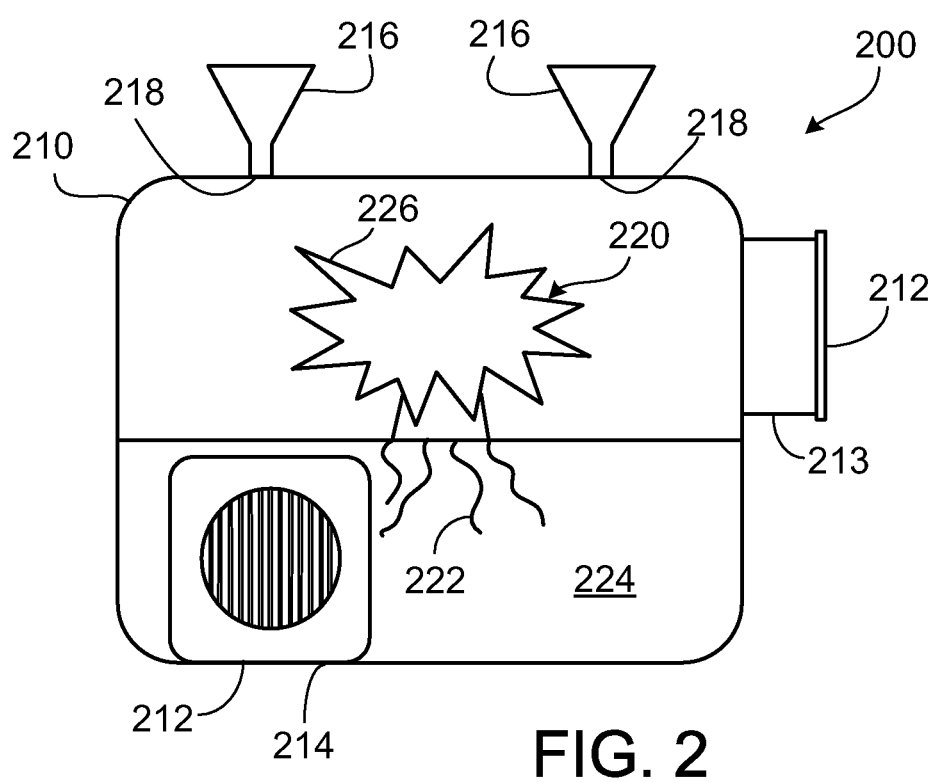
FIG. 2 is a schematic view of an exemplary biological air filter.

Referring to FIG. 2 a chlorophytum plant based air filter 200 was built and tested to demonstrate the possibility of passing air under the action of two simultaneous fans "in reverse" from the atmosphere around the leaves and through the soil of a plant. The filter includes a PLEXIGLAS® housing 210 with small fans 212 mounted on inlet and outlet openings 213, 214 of the housing. A chlorophytum 220 was planted with roots 222 in a soil substrate 224 and stem and foliage 226 extending upward from the soil substrate 224. The air impeller system, made up of the inlet fan 212 (at 213) and the outlet fan 212 (at 214), successfully drew air into the housing 210, past the leaves 226 of the plant, down through the soil substrate 224, and out of the housing 210 back into the environment.

The filter 200 also included funnels 216 attached to small openings 218 in an upper surface of the housing 210 allowed for watering of the plant over the test period. The plant filter successfully filtered the air without plant death for over a week.

Example 2

Figure 3A:
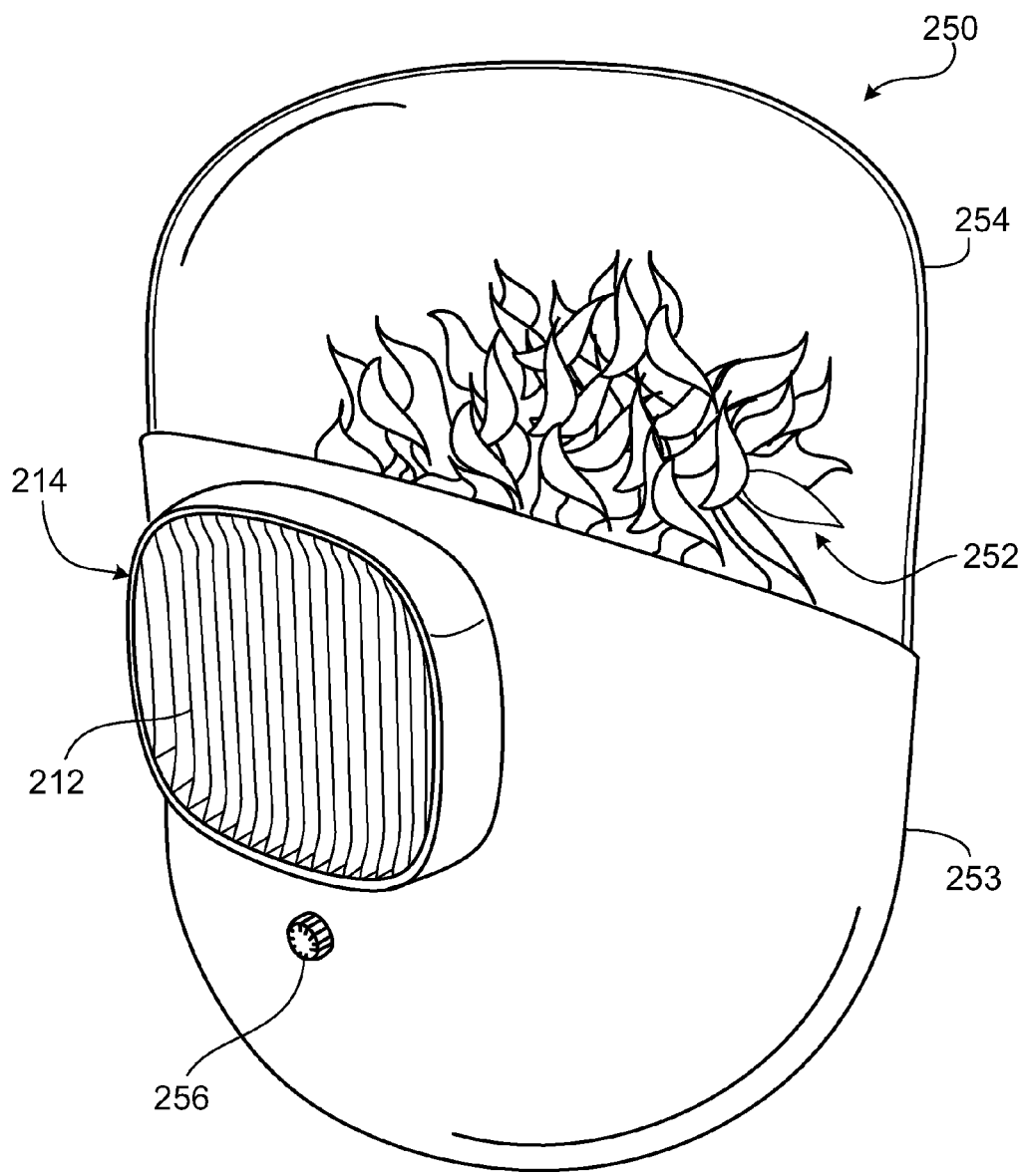
FIGS. 3A and 3B are perspective views of an exemplary biological air filter.
Figure 3B:
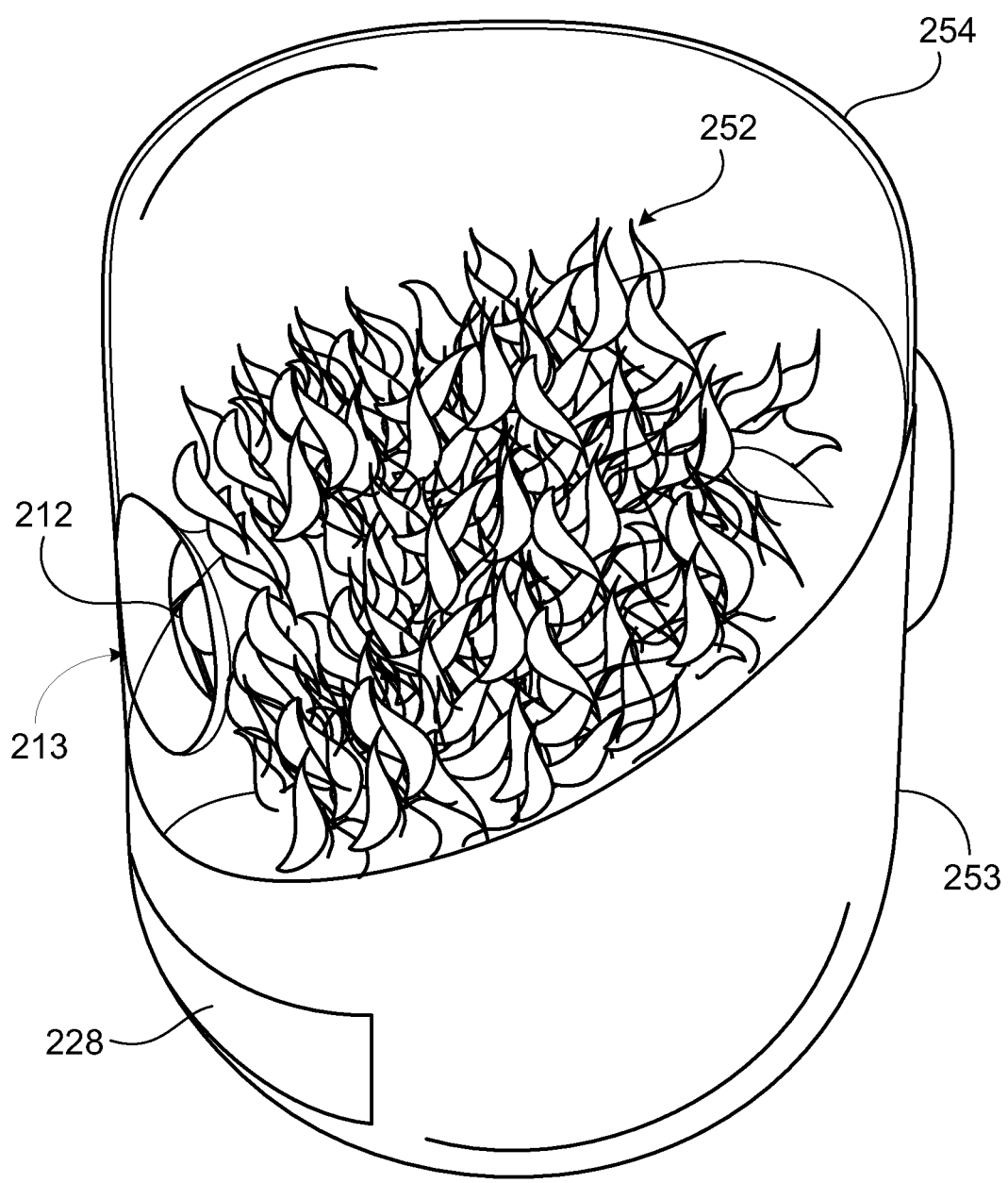
Figure 3C:
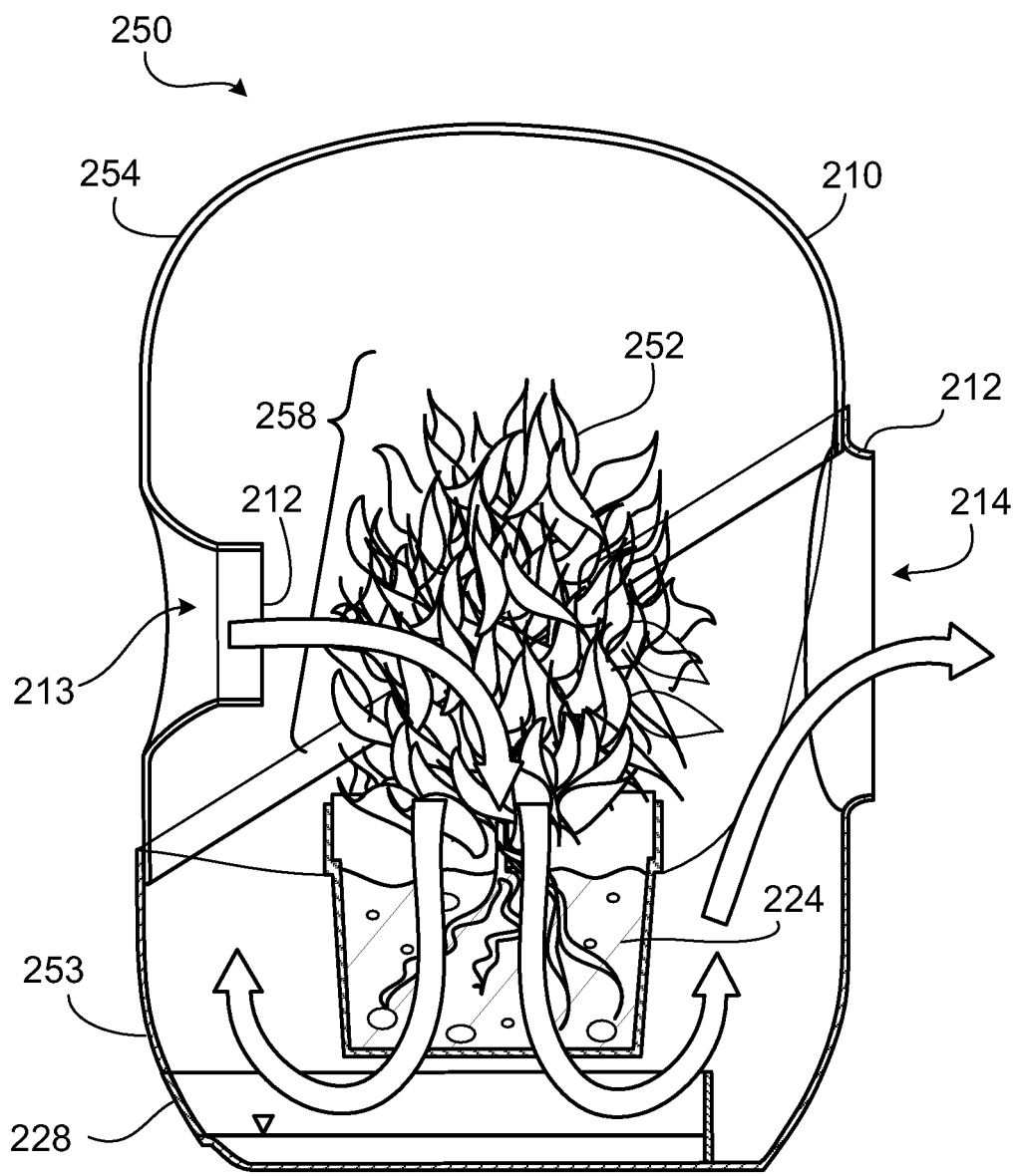
FIG. 3C is a cross-sectional side view of the exemplary biological air filter shown in FIGS. 3A and 3B.
Figure 3D:
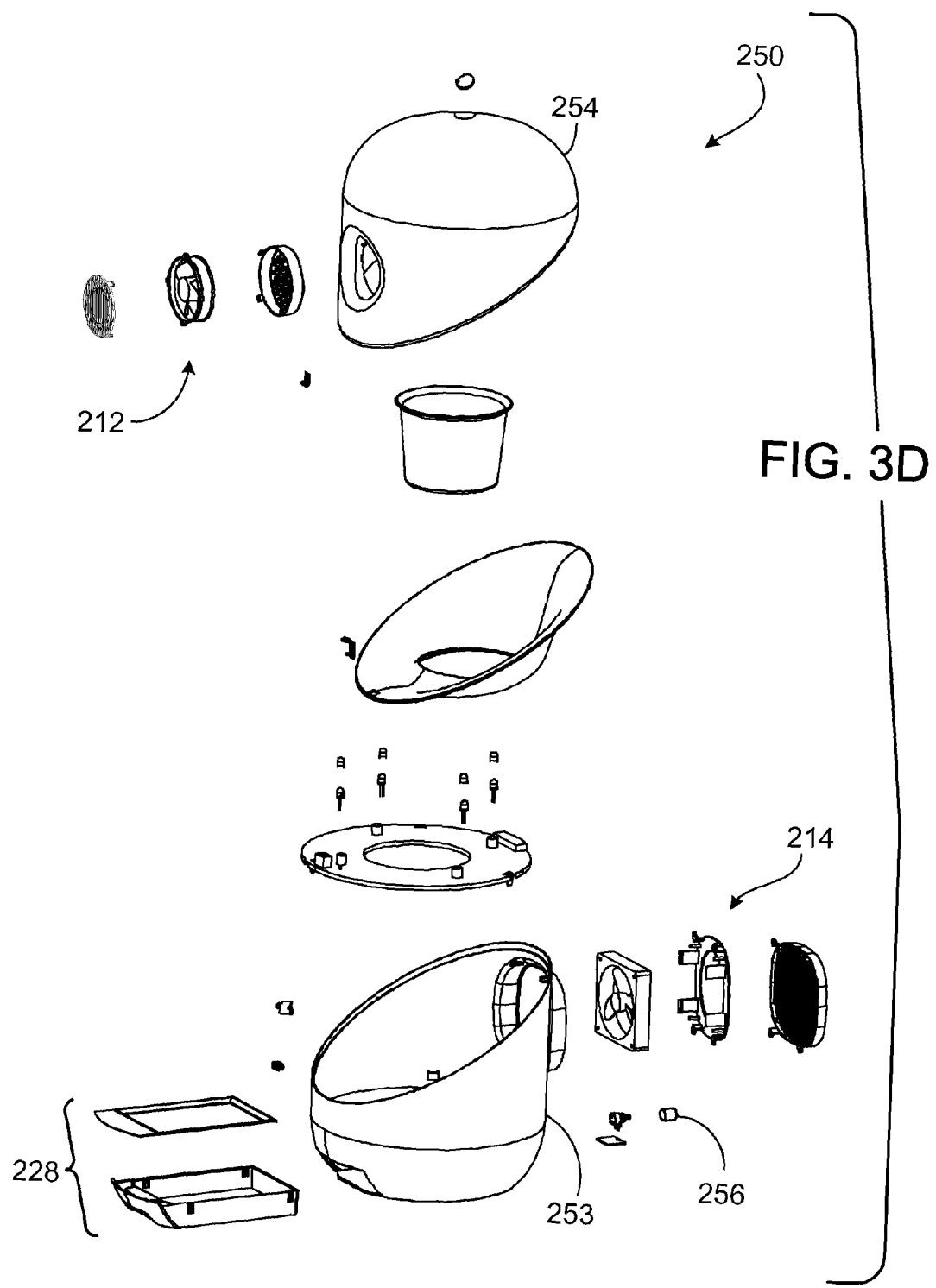
FIG. 3D is a component schematic of the exemplary biological air filter shown in FIGS. 3A and 3B.
Figure 3E:
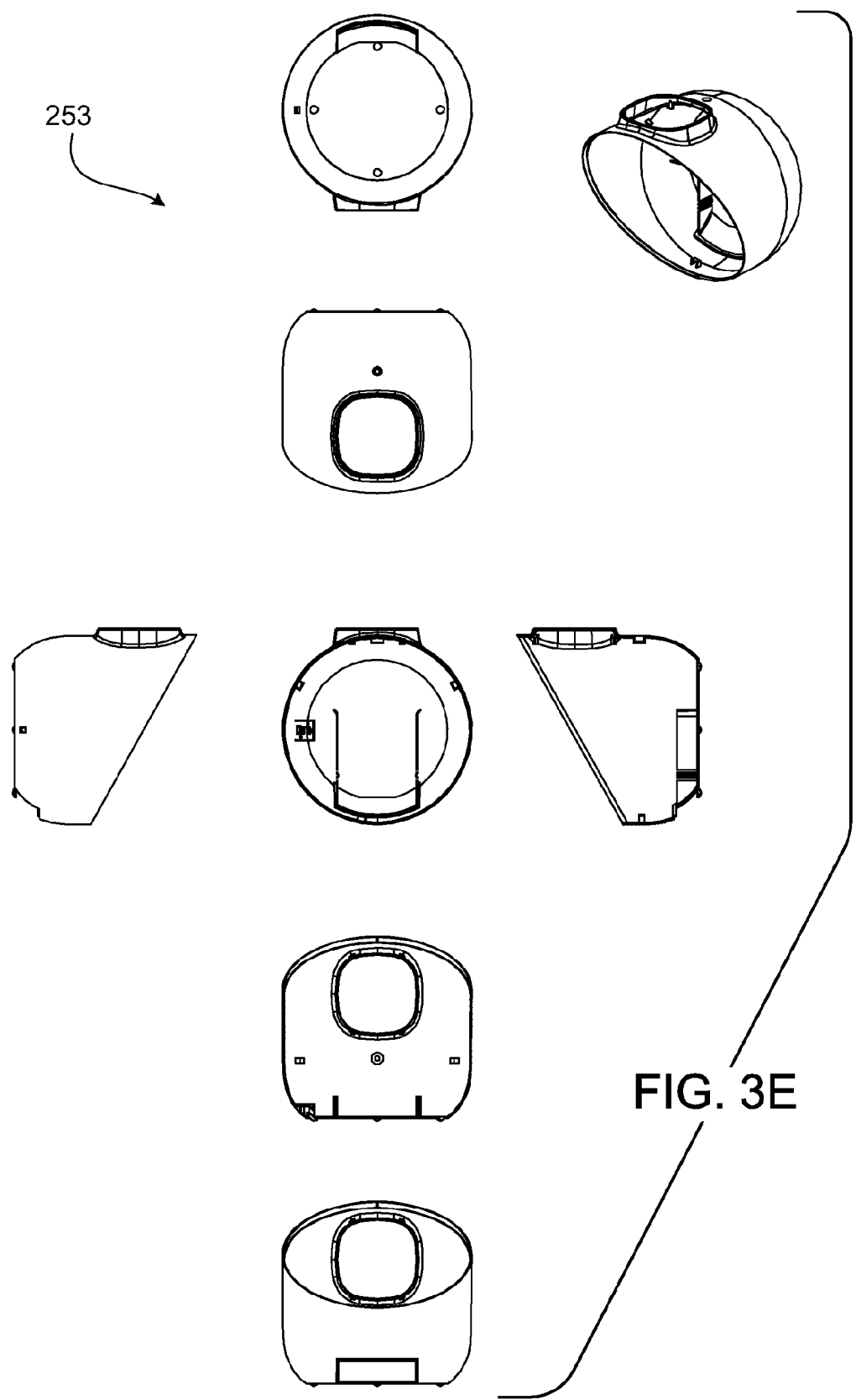
FIG. 3E shows various views of the lower part of the housing of the exemplary biological air filter shown in FIGS. 3A and 3B.
Figure 3F:
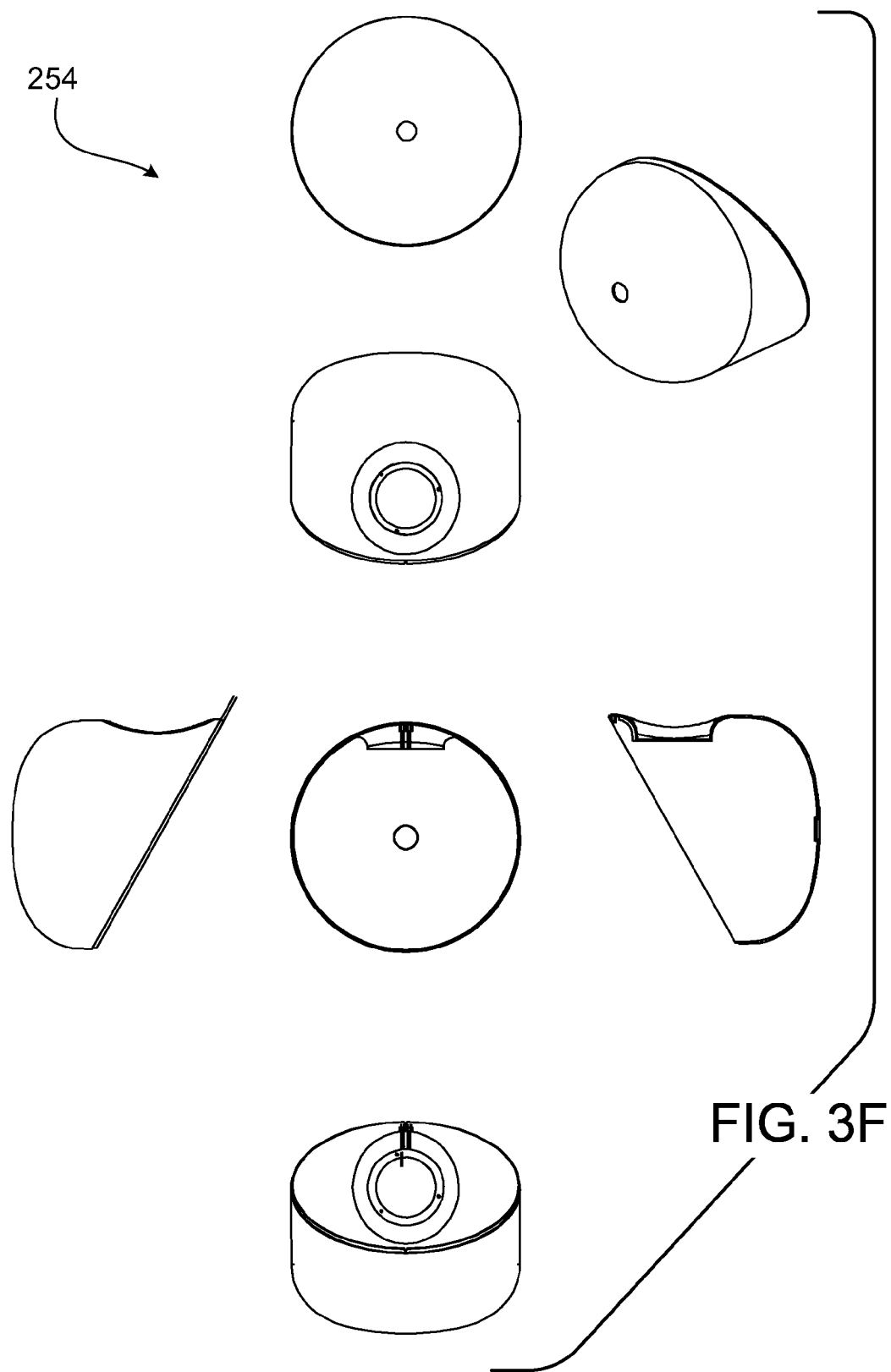
FIG. 3F shows various views of the upper part of the housing of the exemplary biological air filter shown in FIGS. 3A and 3B.

Referring to FIGS. 3A, 3B, and 3C, another exemplary filter 250 was built and tested to demonstrate the feasibility of a long-lasting biological air filter. Like filter 200, the filter 250 possessed input and output fans 212 mounted in inlet and outlet openings 213, 214 of a housing 210. The housing 210 included a lower portion 253 with an aluminum exterior receiving a removable tray 228. The removable tray 228 can be filled with water to provide filter 250 with a reservoir of water, beneath a plant 252 and soil substrate 224.

The plant was placed in standard potting soil, which was atop clay pebbles supported by a fabric mesh. The mesh helped hold the pebbles and soil. A set of wicks facilitated hydration of the soil substrate by capillary forces which induced the upwards flow of water from the reservoir. In this case, the wicks were a cotton fabric. The wicks and/or mesh material used to hold the pebbles and soil could be a standard fabric, a "non-woven" material, or cellulose-based (synthetic or natural) fabric, among other materials.

The housing 210 also included a PLEXIGLAS® portion 254 that covered the top of the plant filter 250 to permit the entry of natural light and facilitate plant health. The speed of the fans 212 was controlled using the adjustable control knob 256. As seen in FIG. 3C, the air passes through inlet 213 directly into the leaf system 258 of the filter 250, permitting effective leaf absorption. As shown in FIG. 3C, the air was next directed past the plant stem and through the core root system and soil substrate 224 before being discharged out of outlet 214.

Example 3

Efficacy tests of biological air filters similar to the exemplary biological filters were conducted in cube-shaped chambers of volume 0.512 cubic meters. Individual Spathyphillum and Orchidea phalaenopsis plants were tested in one chamber, alongside an empty control chamber. Using liquid formol, formaldehyde was released into the chambers until they were found to have roughly 25 ppm. The formaldehyde sources were then removed, and the chambers were subsequently sampled regularly for periods typically of several hours, to determine the efficacy of the filtration device.

Figure 4:
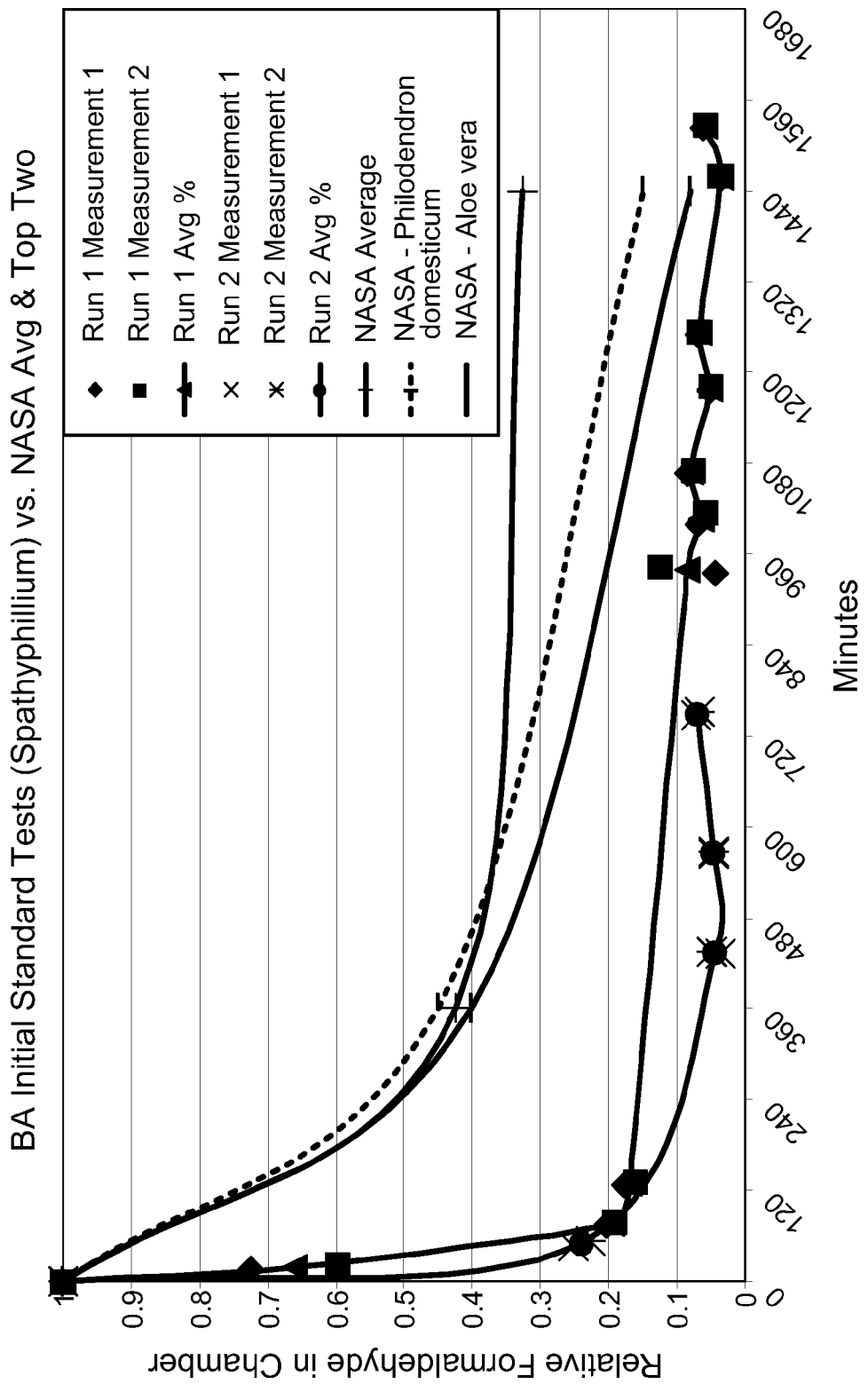
FIG. 4 are the results of formaldehyde efficacy testing of the entire apparatus compared to previously published NASA data.

FIG. 4 compares the results of using filters similar to the filter described with reference to FIGS. 3A, 3B, and 3C to reduce formaldehyde concentration in an enclosed volume of 0.45 $m^3$ to the literature-reported results for a previous NASA plant filtration test. This filter reduced formaldehyde concentration to less than 20% of its initial concentration within about 1 to 1.5 hours with results. By comparison, the plants previously tested by NASA required approximately 10 hours to reduce levels to less than 40% initial concentration and about 16 hours to reduce levels to 20% or less. (Wolverton B C, McDonald R C; "Foliage Plants for Removing Formaldehyde from Contaminated Air Inside Energy-Efficient Homes and Future Space Stations" NASA Technical Memorandum, NASA TM-84674, December 1982).

The relevance of these numbers relates both to the speed of toxic gas absorption in a closed room or volume, and the capacity of the filters or plants to remove toxic substances at all. Using our initial test results, obtained for a volume of 0.45 $m^3$, a closed room the size of 4×5×3 m can be cleaned by 2 apparatuses in approximately 98 hours, or about 4 days. By contrast, two of the very best-performing plants tested by NASA would require approximately 40 days to accomplish the same level of reduction. Given the rapidity of air changeover and the rate of production of gases by sources in the room, this suggests the NASA tested plants will likely have relatively little effect.

Example 4

Figure 5A:
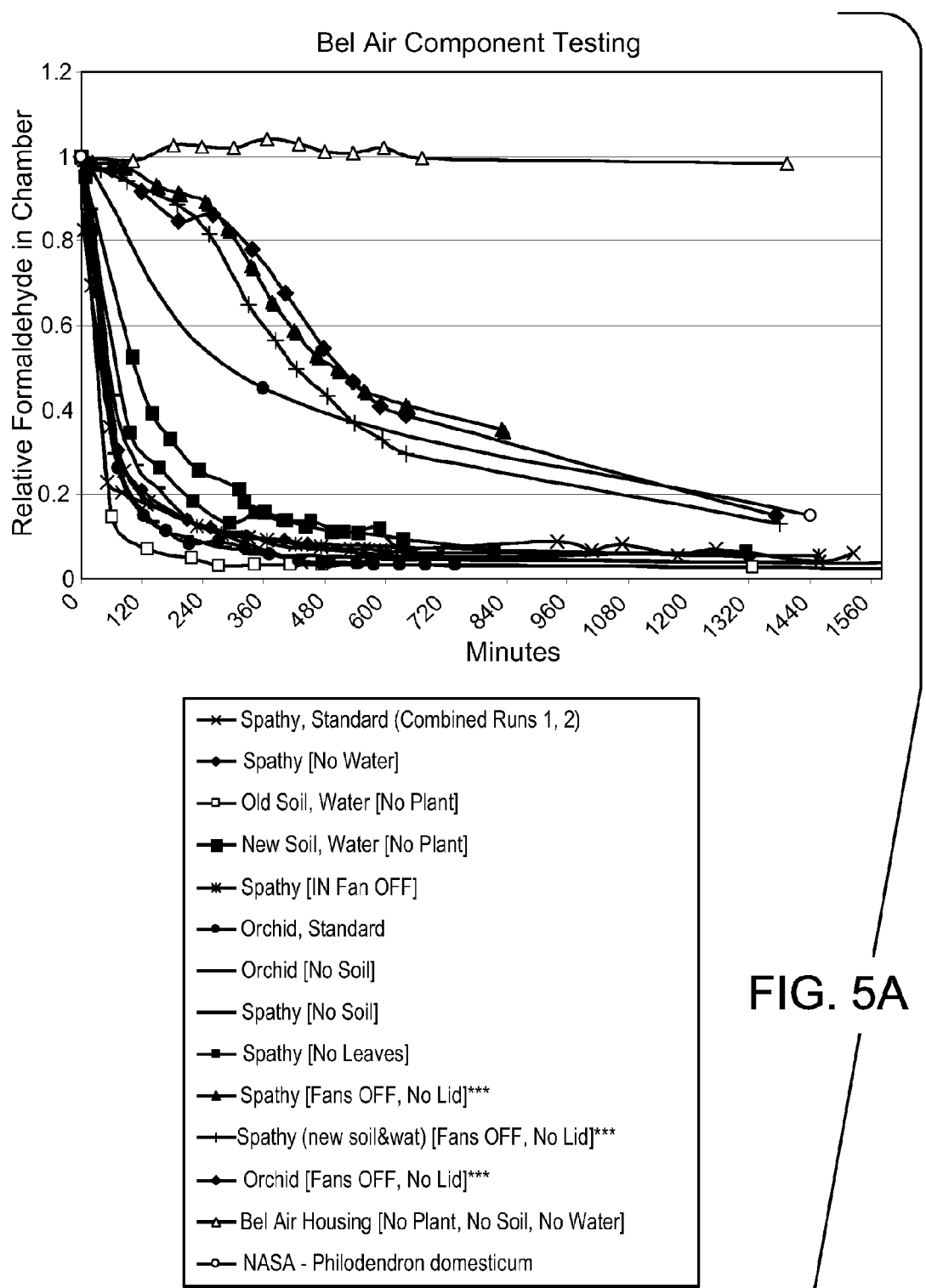
FIG. 5A are the results of formaldehyde efficacy testing of the various components of the apparatus.

The results of FIG. 5, in which the apparatus is tested with different combinations of the individuals parts present/active, reveal that the strength of the inlet and outlet fans is an important factor in the apparatus design. If the fans are not in operation, absorption of toxic gases occurs by diffusion alone, a slow process. That the NASA filter, running at full capacity with its fans on, is only modestly more efficient at rapid air cleaning than our filter design without the fans functioning demonstrates the importance of the outlet fan. In this case, the outlet fan is up to 6 times more powerful than the NASA filter (fan flow rate of 185 cubic meters/hr compared to 25-50 cubic meters per hour). This factor of 6 corresponds well with the relative time it requires for the NASA filter to accomplish this cleaning effectively.

Equivalents

Those skilled in the art will recognize, or be able to ascertain using no more than routine experimentation, many equivalents to the specific embodiments described herein. Such equivalents are intended to be encompassed by the following claims. Although a number of embodiments have been described, it will be understood that various modifications may be made without departing from the spirit and scope of the invention.

Figure 6:
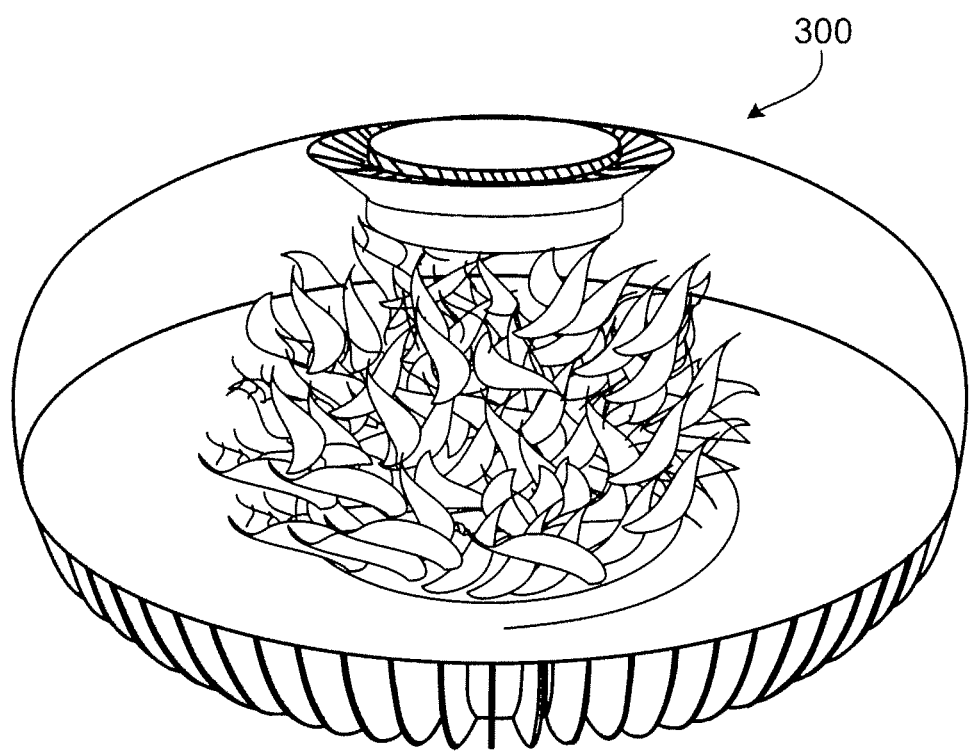
FIG. 6 is a schematic view of an exemplary biological air filter.

For example, although the filters 200, 250 have side inlets, some filters include top inlets. Referring to FIG. 6, an exemplary filter 300 includes an air inlet on top of the housing, and the air outlet is in the bottom of the housing.

Figure 7:
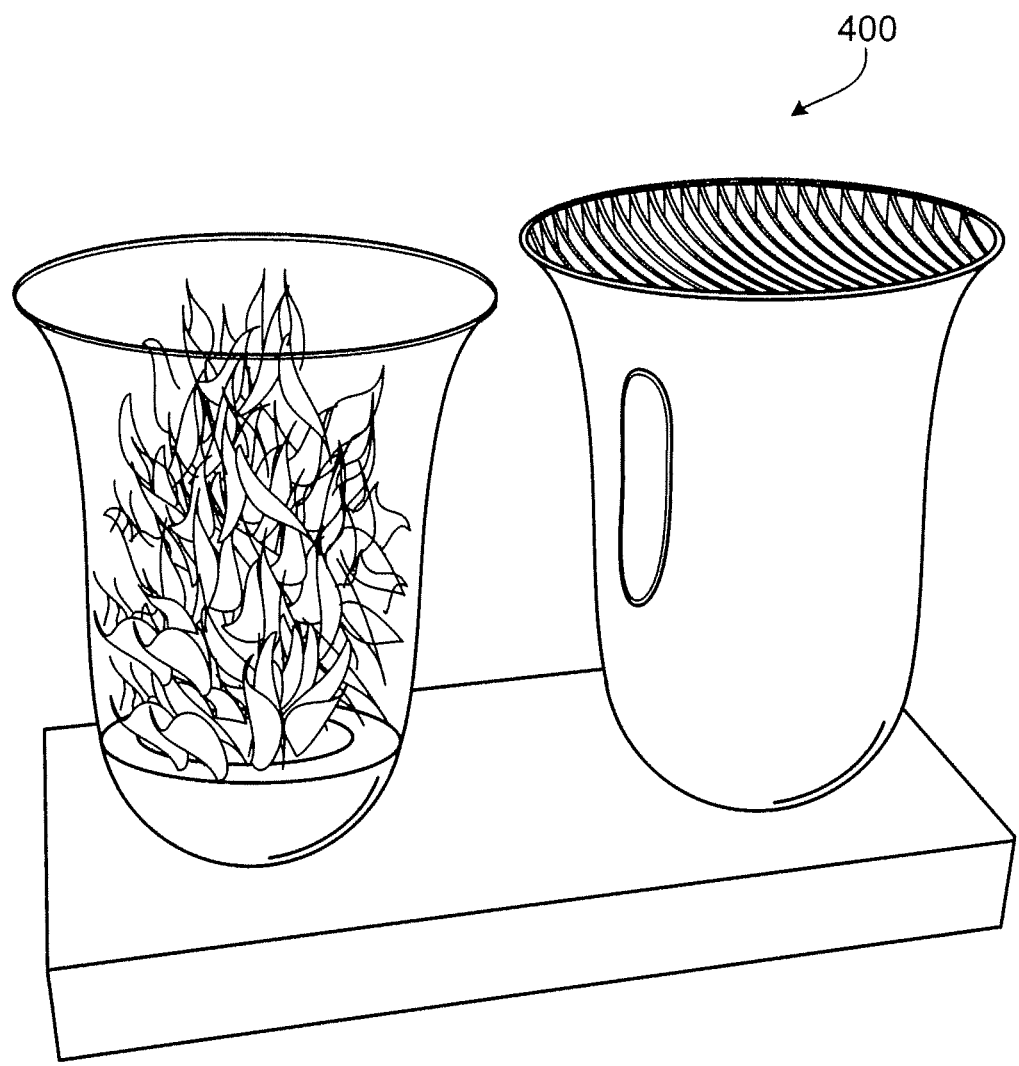
FIG. 7 is a schematic view of an exemplary biological air filter.
Figure 8:
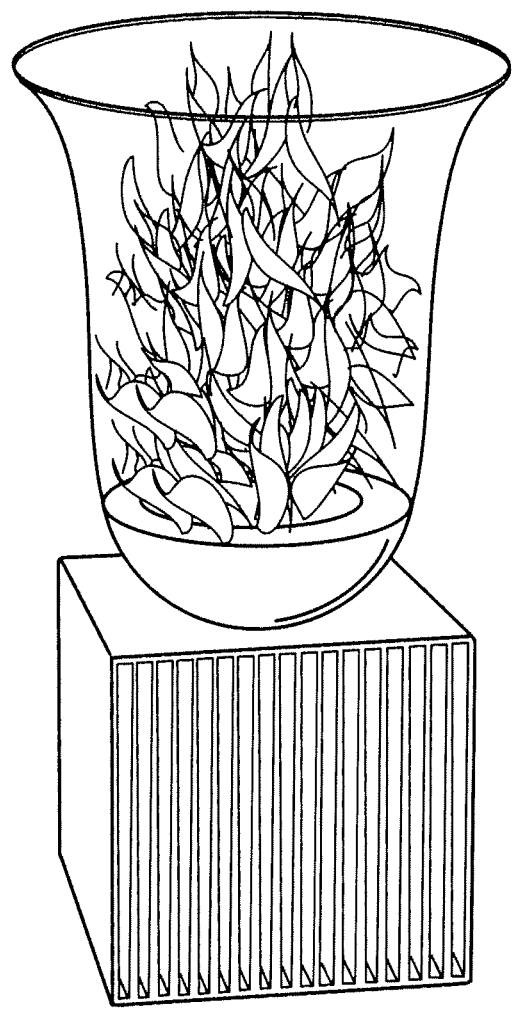
FIG. 8 is a schematic view of an exemplary biological air filter.

In another example, although the earlier filters 200, 250 have housings with a substantially enclosed inner volume containing the filter components, some filters have a open-sided housing. Referring to FIGS. 7 and 8, filters 400 and 500 have a plant contained in a vessel that is open to the surrounding air. In both cases, air is drawn in, over, and through the plant, through soil, across the water base, and then up and out through the outlet fan.

Accordingly, other embodiments are within the scope of the following claims.

What is claimed is:

1. A method for treating air, the method comprising:
drawing air into an internal volume defined by a housing;
directing air past leaves of a plant, the leaves disposed generally within the internal volume prior to the air passing through a soil substrate disposed in the housing and supporting roots of the plant;
substantially removing impurities from the air; and
moving the air from the housing to an external environment.

2. The method of claim 1, further comprising contacting the air with water in a water reservoir, or with water vapor that substantially originated from a water reservoir.

3. The method of claim 1 or 2, wherein directing air past leaves of the plant prior to the air passing through the soil substrate supporting roots of the plant comprises operating at least one fan to cause ambient air to enter the internal volume defined by the housing.

4. The method of claim 3 further comprising varying a ratio of a speed of a first fan to a speed of a second fan.

5. The method of claim 1, wherein moving air from the internal volume to an external environment comprises operating a fan to cause air in the internal volume of the housing to be discharged out of the housing.

* * * * *

UNITED STATES PATENT AND TRADEMARK OFFICE
CERTIFICATE OF CORRECTION

| | | |
|---|---|---|
| PATENT NO. | : 8,707,619 B2 | Page 1 of 1 |
| APPLICATION NO. | : 12/682353 | |
| DATED | : April 29, 2014 | |
| INVENTOR(S) | : Edwards et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this
Eleventh Day of August, 2015

Michelle K. Lee
*Director of the United States Patent and Trademark Office*